Jan. 29, 1963
M. B. VILENSKY
3,075,920
METHOD OF PRODUCING A FERRITE BODY AND
PRODUCT OBTAINED THEREBY
Filed May 26, 1961
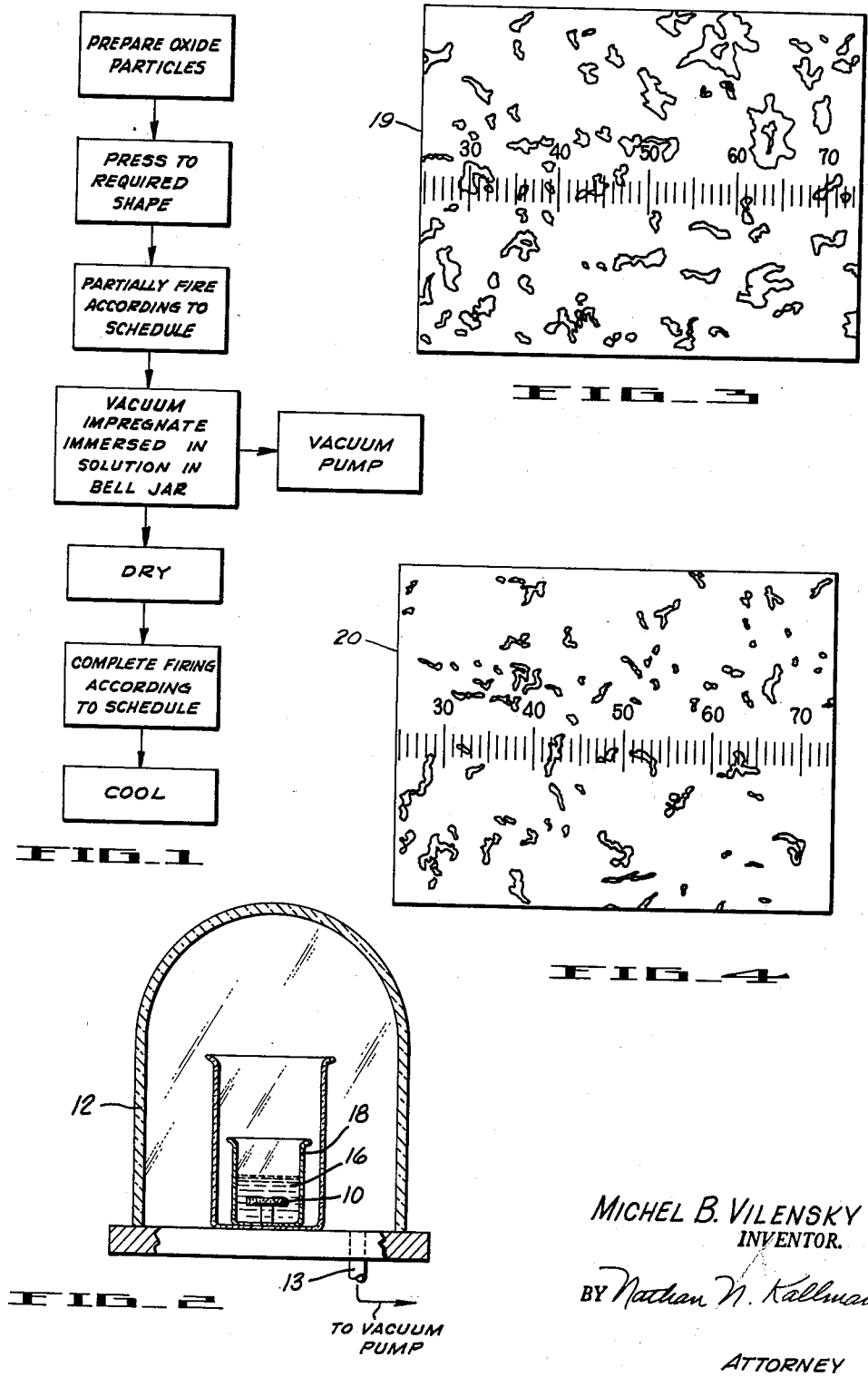
MICHEL B. VILENSKY
INVENTOR.
BY Nathan N. Kallman
ATTORNEY United States Patent Office 3,075,920
Patented Jan. 29, 1963

3,075,920
METHOD OF PRODUCING A FERRITE BODY AND PRODUCT OBTAINED THEREBY
Michel B. Vilensky, San Francisco, Calif., assignor to Ampex Corporation, Redwood City, Calif., a corporation of California
Filed May 26, 1961, Ser. No. 112,968
10 Claims. (Cl. 252—62.5)

The present invention relates to ferrite materials, and particularly to methods of producing compact ferrite bodies, and the products obtained by such methods.

Many ferrite materials are now well known, and bodies constructed of such materials have been widely used in the construction of various types of electronic equipment, such as magnetic recording heads, microwave devices, and antennas. Ferrite materials usually consist of a mixture of the oxides of particular bivalent metals (e.g., nickel and zinc) with ferric oxide, $Fe_2O_3$, these being formed into a mass and heated to sintering temperature to produce the ferrite body.

The known ferrite bodies have usually been subject to one or more of a number of disadvantages. Being made by a sintering process, their physical strength and ductility have usually been low, so that such bodies are difficult to fabricate. For the same reasons they are readily damaged and have relatively short operating lifetimes. Physical characteristics have also suffered because these ferrite bodies have usually been of comparatively low density due to a high degree of porosity. Excess porosity also introduces a tendency to permit the undesirable passage of gases and moisture, causing breakage of a part, or the formation of an occluded structure. These factors invariably introduce poor magnetic qualities, such as low and non-uniform magnetic permeability.

A number of different techniques have been employed in the prior art for reducing the above physical and magnetic disadvantages found in ferrite bodies. Impregnation has been tried, but has not overcome the tendency to brittleness and cracking. Additionally, foreign materials have been introduced, markedly decreasing the permeability and other magnetic characteristics of the fabricated part.

It is therefore an object of the present invention to provide improved methods of producing ferrite bodies having superior combinations of physical and magnetic properties.

Another object of the invention is to provide a method of producing an impregnated ferrite body to obtain greater strength and ductility than has heretofore been available.

Another object of the present invention is to provide a method of forming a ferrite body to provide a greater density and lower porosity than has been heretofore obtained.

Yet another object of the invention is to provide improved ferrite bodies having high density, good physical characteristics and excellent magnetic properties.

Dense and strong ferrite bodies are provided in accordance with the invention by preparing a compact, in the desired form, of the materials for the needed ferrite composition. The compact is then at least partially fired for sintering and to convert the composition to the spinel crystal structure. After the initial firing, the body derived is immersed in room temperature in a solution of chosen salts, and vacuum impregnated to release contained gases and to fill the pores of the body with the salt residue. After drying, the body is subjected to a final firing sequence in which the salts are converted to the corresponding oxides. In accordance with the invention, the chosen salts are of such composition and in such proportion that on conversion to the oxide form they have an identical chemical composition to the ferrite body itself.

A better understanding of the invention may be had from the following description, taken in conjunction with the accompanying drawings, in which:

FIGURE 1 is a flow sheet, representing diagrammatically a process in accordance with the invention;

FIGURE 2 is a diagrammatic view of impregnation apparatus employed in accordance with the invention;

FIGURE 3 is a representation of a photomicrograph of a portion of a ferrite body which has not been impregnated; and FIGURE 4 is a representation of a photomicrograph similar to FIGURE 3, in which the ferrite body has been impregnated in accordance with the invention.

Referring to the drawings, and particularly to FIGURE 1, there is shown a process for the production of a high density ferrite body. As a first step in the process, a batch of ferrite material of any known type may be prepared by conventional means. The ferrite employed may, for example, be of the type containing nickel (or a combination of nickel and copper) and zinc oxides in combination with $Fe_2O_3$; zinc and manganese oxides in combination with $Fe_2O_3$; or nickel and magnesium oxides in combination with $Fe_2O_3$; or other known oxide combinations. Such oxides are preferably utilized in the form of very fine grains. Homogeneity of the selected oxides may be produced through the use of a stainless steel ball mill, the milling being carried out in stainless steel containers loaded with required numbers of steel balls with the addition of water. In addition, the milling promotes a solid state reaction among these oxides. After milling, the material is screened using 40 mesh size screen, dried at room temperature, and then pulverized with a hand mortar. The material is then preliminarily fired for several hours at a temperature at which spinel is formed (e.g., 800–1100° C.), and cooled to room temperature. Relatively little spinel structure is present at this point. Further ball milling may be required, and the material is then finally screened to pass particles of approximately 40 mesh size or less. Finer particles usually provide a superior structure.

A quantity of the oxides processed in this manner is then formed into a body of any desired shape. The present procedure, given by way of example, is for the fabrication of a recording head component. The initial forming may be accomplished by placing the particles, together with a binder (e.g., 1% by weight of a resin alone or a resin and lubricant combined) under pressure in a properly configured die. A steel die and a hydraulic pressure of 5–8 tons per square inch have been found suitable. The compact thus obtained is in the desired shape and may then be dried by leaving the body at room temperature for in excess of 24 hours. After this interval the binder may be decomposed and eliminated by heating up to 400° C., a slow firing in an electric furnace being employed for best results.

The formed body is then fired in order to effect either partial or substantially complete conversion of the metallic oxides to the spinel structure and to sinter the compacted particles. A schedule of several firing steps is followed, the times and temperatures employed depending on the oxide composition of the body and the degree of conversion desired, with a partial conversion being preferred. For example, in the case of a nickel-zinc ferrite body (15 mol percent NiO, 35 mol percent ZnO and 50 mol percent $Fe_2O_3$), it has been found advantageous to first heat the body slowly to about 400° C., at which temperature the body is held for about 2 hours. During this time, migration of atoms from one lattice form to another occurs in the material. The body is then heated in the next step at about 600° C.

for about 4 hours. At this temperature, some spinel starts to form. The temperature then is raised gradually to about 900° C., at which temperature more complete formation of the characteristic spinel structure takes place. This temperature is maintained for at least 4 hours. A longer interval, of from 6–8 hours, is not harmful. Finally, the temperature may be increased to about 1100° C., which temperature is held for about 1–2 hours, but not less than 1 hour, as a preparatory measure for the impregnation procedure to be discussed below. The preliminary firing and sintering imparts physical strength to the body, which would otherwise be easily deformed or disintegrated during handling.

The partially fired, formed body which results from sintering the metallic oxide is cooled to room temperature by any convenient method, such as, for example, by cooling in the furnace overnight. A rate of cooling of at least 10° C. per minute, is required for best results. The body is then subjected to the vacuum impregnation operation (see also FIGURE 2). As may be seen, the ferrite body 10 is placed in a container such as a bell jar 12 coupled by a hose 13 to a vacuum pump (not shown). An impregnating solution 16 is contained in a vessel, such as a beaker 18 set in the bell jar 12. The solution 16 contains salts (e.g., the sulphate salts) of the same metals as are present in the ferrite body 10, the salts being dissolved in $H_2O$. Salts of the highest purity obtainable, i.e., "electronic grade" should be used. The salts are dissolved in a proportion accurately calculated to form, upon firing, oxides corresponding in percentage composition to the oxides making up the ferrite body 10 itself. For the vacuum impregnation operation, there may be employed the Kinney PW Packaged High Vacuum Pumping Unit PW-600 (trade name), manufactured by Kinney M.F.C. Division of the New York Air Brake Company.

When the vacuum pump is set into operation, a high vacuum (e.g., up to 30 in. of Hg) is gradually applied to the system, so that any gas such as air occluded in the pores of the ferrite body 10 is evacuated. At the same time, some of the salt solution 16 in which the ferrite body 10 is immersed enters the evacuated pores. The air or other gas in the body 10 escapes as bubbles in solution, and the end point of the impregnation procedure is observed when no more bubbles appear. The pressure is then held for an additional time (e.g. ½ hour) and then gradually returned to normal.

Following the impregnation procedure, the ferrite body 10 is removed from the bell jar 12 and dried by any conventional method, preferably at room temperature in air. The gases occluded in the pores of the body 10 have at this point been evacuated and the pores at least partly filled and sealed with the metallic salts, and reduced considerably from their original size. With salts of adequate purity no impurities are introduced into the structure.

The resulting impregnated ferrite body 10 is then again placed in a furnace (not shown) for a final firing. If the ferrite body 10 has only been partially converted to the spinel structure in the original firing, the final firing is designed in part to complete the conversion and the sintering process. Such final firing, moreover, also thermally decomposes the impregnated metallic salts into their corresponding complex oxides. If the ferrite body has been fully converted in the original firing, the final firing will, of course, serve only to convert the salts. Here, again, the temperature and time of firing will depend upon the metallic salts to be converted, and the temperature cycle which the ferrite body has previously undergone in the original firing. The original firing schedule, already described, is preferably employed again here. After the final step (at which 1100° C. is reached), the temperature is increased to final firing temperatures of about 1300° C., for about 4–5 hours; and of about 1350°–1400° C. for about 1 hour.

Subsequent to the final firing, the ferrite body 10 is cooled to room temperature, preferably by one of three methods, depending upon the nature of the ferrite: furnace cooling, air quenching or nitrogen cooling. In the case of nickel-zinc ferrites, preliminary cooling in the furnace to 600° C. is preferred, following by removal from the furnace (or complete furnace cooling). Air quenching has the advantage of arresting the size of crystal growth and providing a stronger ferrite. Nitrogen cooling, from 1100° C., down to room temperature is preferred for manganese-type ferrites, in order to avoid non-magnetic structures.

One or more additional vacuum impregnations of the ferrite body 10 might in some instances be desirable, prior to firing, in order to provide sufficiently great density of the final product. It is found however that, with proper operating conditions a single procedure is sufficient.

Ferrite bodies which have been impregnated by salts which are converted to oxides in accordance with the present invention have been found to have substantially greater density than non-impregnated ferrite bodies of the same metallic oxide composition, as well as a much lesser degree of porosity. The oxides combine with the body of the ferrite to form a homogeneous structure of identical chemical composition. The pores are sealed and the structure has markedly improved physical characteristics as well as improved magnetic uniformity. Referring to FIGURE 3 a portion 19 of a nickel-zinc type ferrite body is shown at a magnification of 400, having been prepared in conventional manner by firing a ferrite body composed of 15 mol percent NiO; 35 mol percent ZnO; and 50 mol percent $Fe_2O_3$. The ferrite body portion 19 is to be compared with the ferrite body portion 20 shown in FIGURE 4, which has been prepared from metallic oxides of the same composition, but in accordance with the invention. The difference in porosity and uniformity as between the portions 19 and 20 is obvious, the small enclosed areas defining the porous zones of the material. The portion 19 might, for example, have a density of about 4.8 as compared to a density of about 5.1 for the portion 20.

*Example 1*

A batch of material containing metallic oxides was prepared in the following proportions for a nickel-zinc ferrite:

| | Molecular percent |
|---|---|
| NiO | 15 |
| ZnO | 35 |
| $Fe_2O_3$ | 50 |

After initial grinding to the desired fineness and inclusion of a binder, a portion of the above batch was pressed into the shape of twelve bars, each about 1¼″ x ⅛″ x 5/16″, a hydraulic press operated at about 5 tons/in.² being employed. The bars were then slowly heated in an electric furnace to a temperature of about 400° C., and maintained at this temeperature for about 2 hours. The bars were then heated to about 600° C., for about 4 hours. Thereafter, the bars were slowly heated to 900° C., and held at this temperature for about 16 hours. The temperature was then increased to and held at 1100° C. for about 2 hours, after which the bars were furnace cooled for a period of about 15 hours, to room temperature.

The partially converted spinel structure ferrite bars thus prepared were then placed in a bell jar, connected by tubing to a beaker containing impregnating solution having the following composition of salts dissolved in 75 ml. of distilled water:

| | Grams |
|---|---|
| $NiSO_4 \cdot 6H_2O$ | 6.64 |
| $ZnSO_4 \cdot 7H_2O$ | 17.54 |
| $FeSO_4 \cdot 7H_2O$ | 23.20 |

The bell jar was then subjected to a vacuum of about 30 in. of Hg, for a period of about 1½ hours, this being about ½ hour longer than escaping air bubbles were visible. After slow release of the vacuum, the ferrite bars were then removed from the solution and allowed to dry at room temperature.

The impregnated bars were then fired, employing the same firing schedule set forth above. Following the final state (at 1100° C.), they were further heated to about 1300° C. for about 4 hours; and then to about 1400° C. for about 1 hour. The nickel-zinc ferrite bars were thereafter cooled to about 600° C. in the furnace; and finally air quenched. The bars, upon examination, were found to have a density of 5.12 grams/cm.$^3$. Prior to vacuum impregnation, the density was determined to be 4.82 grams/cm.$^3$.

*Example 2*

Zinc-manganese ferrite bars were also prepared from a batch having the following composition:

| | Molecular percent |
|---|---|
| MnO | 17 |
| ZnO | 33 |
| $Fe_2O_3$ | 50 |

After initial firing in a sequence similar to that of Example 1, the bars were vacuum impregnated in a solution of iron, zinc and manganese sulphates. Following firing in a cycle corresponding to that of Example 1, the bars were reduced to room temperature in a nitrogen atmosphere, and found to have a density of 4.725 g./cm.$^3$. The density before impregnation had been 4.320 grams/cm.$^3$.

*Example 3*

Another type of nickel-zinc ferrite bar was prepared from a batch having the following composition:

| | Mol percent |
|---|---|
| NiO | 17.50 |
| ZnO | 33.20 |
| $Fe_2O_3$ | 49.30 |

After initial firing and vacuum impregnation in a sequence similar to that of Example 1, a marked change in porosity was effected (see FIGURE 4). The density of the bar was increased from 4.88 grams/cm.$^3$ to 5.16 grams/cm.$^3$.

*Example 4*

In another example of a nickel-zinc ferrite, the following successive steps were used in firing prior to impregnation:

| | Hours |
|---|---|
| 400° C. | 2 |
| 900° C. | 4 |
| 1000–1100° C. | 4 |

Thereafter the ferrite was vacuum impregnated in sulphate salts of nickel, zinc and iron, selected in accurate proportions to form oxides correseponding to the ferrite composition. Following drying, the following selected firing schedule was used:

| | Hours |
|---|---|
| 400° C. | 2 |
| 900° C. | 4 |
| 1100° C. | 12 |
| 1300° C. | 4 |
| 1360° C. | 1 |

The ferrite was then cooled back to room temperature according to the following schedule:

From 1360° C. to 1100° C.—2 hours;
From 1100° C. to 600° C.—4 hours;
At 600° C.—6 hours; and then air quenched.

A similar increase in density of about 0.405 gram/cm.$^3$ was observed.

It will be appreciated that various alternatives in addition to those given will present themselves to those skilled in the art. Also, the ferrite material formed in accordance with this invention may be useful for the manufacture of various magnetic structures other than recording heads such as magnetic cores that are used in stacked arrays. Accordingly, the invention should be considered to include all modifications and variations falling within the scope of the appended claims.

What is claimed is:

1. The method of producing an impregnated ferrite body which comprises the steps of subjecting a sintered ferrite body to vacuum impregnation by a salt solution, the proportions of which are selected to form oxides upon firing having the same chemical composition as the body, thereafter drying the impregnated ferrite body, and then firing the impregnated ferrite body to thermally decompose the impregnation salts and form oxides corresponding in composition to the body.

2. The method of producing a dense and strong ferrite body which includes the steps of subjecting a partially sintered ferrite body having metallic oxides to vacuum impregnation by a salt solution which upon firing forms oxides having the same chemical composition as the body, thereafter drying the impregnated ferrite body, and then firing the impregnated ferrite body to thermally decompose the impregnation salts and form the corresponding oxides, the firing further completing the sintering of the metallic oxides originally in the body and sintering the decomposition oxides.

3. The method of producing a ferrite body which includes the steps of subjecting an at-least partially sintered ferrite metallic oxide body to vacuum impregnation by a salt solution at least twice which upon firing forms oxides having the same chemical composition as the ferrite-type body, drying the impregnated ferrite body following each impregnation step, and firing the impregnated ferrite body to thermally decompose the impregnation salts and form the corresponding oxides after each drying step, the firing further sintering the decomposition oxides.

4. The method of producing a ferrite body which includes the steps of forming a quantity of sintered ferrite having metallic oxides into a body of predetermined shape, firing the body at temperatures and for times sufficient to partially sinter the metallic oxides, cooling the ferrite body to room temperature, subjecting the ferrite body to vacuum impregnation by a salt solution of metallic salts corresponding to the metallic oxides and in proportions which upon firing form oxides having the same chemical composition as the body, drying the impregnated ferrite body, and firing the impregnated ferrite body at temperatures and for times which thermally decompose the impregnation salts and form the corresponding oxides, the firing further sintering the decomposition oxides and completing the sintering of the originally present metallic oxides.

5. The method of producing a relatively dense ferrite body which includes the steps of forming a sintered ferrite having metallic oxides into a body of selected shape, firing the body at temperatures and for times to partially convert the oxides to the spinel crystal structure and to sinter the metallic oxides, subjecting the ferrite body to vacuum impregnation in a salt solution which upon firing forms oxides having the same chemical composition as the body, and finally firing the impregnated ferrite body to thermally decompose the impregnation salts into the corresponding oxides and to fully convert the original metallic oxides into the spinel crystal structure.

6. The method of producing a dense ferrite body which includes the steps of subjecting a sintered ferrite body having metallic oxides to vacuum impregnation by a salt solution selected to form oxides upon firing having the same chemical composition as the body, firing the impregnated ferrite body to thermally decompose the impregnation salts and form the corresponding oxides, the firing further sintering the decomposition oxides, and finally cooling the body to room temperature.

7. The method of producing a ferrite body which includes the steps of subjecting a sintered ferrite body having metallic oxides to vacuum impregnation by a solution of metal sulphates which upon firing form metallic oxides having the same chemical composition as the body, drying the impregnated ferrite body, and firing the impregnated ferrite body to thermally decompose the impregnation salts and form the corresponding oxides.

8. The method of producing a ferrite body, comprising the steps of placing a sintered ferrite body having metallic oxides in a container, preparing a salt solution of metallic salts corresponding to the metallic oxides of the body, evacuating air from the container, consequently importing but suction a portion of the salt solution into the container for impregnation of the body, drying the impregnated ferrite body, and firing the impregnated ferrite body to thermally decompose the salts into the corresponding oxides and fully convert the metallic oxide body into the spinel crystal structure.

9. A ferrite body, consisting essentially of a ferrite body of substantially completely sintered original metallic oxide material, the pores of the body being at least partially sealed after drying by sintered thermally decomposed oxides of metallic salts that have impregnated such pores by vacuum means, the oxides of decomposition corresponding in chemical composition to the original metallic oxides of the ferrite body.

10. A dense and strong ferrite body, consisting essentially of a ferrite body of substantially completely sintered original metallic oxide material, the pores of the body including sintered thermal decomposition oxides of metal sulphates that have impregnated such pores by vacuum means, the decomposition oxides corresponding in chemical composition to the original metallic oxides of the ferrite body.

References Cited in the file of this patent

FOREIGN PATENTS 739,069     Great Britain _____ Oct. 26, 1955